(12) United States Patent
Burden et al.

(10) Patent No.: US 8,156,946 B2
(45) Date of Patent: Apr. 17, 2012

(54) NAIL FILING AND ROUNDING APPARATUS

(75) Inventors: Sharon Burden, Dayton, OH (US); Ron Castonguay, Miamisburg, OH (US)

(73) Assignee: Miraclecorp Products, Dayton, OH (US)

( * ) Notice: Subject to any disclaimer, the term of this patent is extended or adjusted under 35 U.S.C. 154(b) by 244 days.

(21) Appl. No.: 12/636,014

(22) Filed: Dec. 11, 2009

(65) Prior Publication Data

US 2011/0139168 A1 Jun. 16, 2011

(51) Int. Cl.
*A45D 29/18* (2006.01)
(52) U.S. Cl. ...................................................... 132/76.4
(58) Field of Classification Search .................... 132/73, 132/74.5, 75.6, 76.4; D28/59; 119/600, 119/608, 609
See application file for complete search history.

(56) References Cited

U.S. PATENT DOCUMENTS

| | | | | |
|---|---|---|---|---|
| 2,564,349 A | * | 8/1951 | Thal | 132/75.6 |
| 2008/0099032 A1 | * | 5/2008 | Jackson | 132/200 |

* cited by examiner

*Primary Examiner* — Rachel Steitz
(74) *Attorney, Agent, or Firm* — Thompson Hine LLP

(57) ABSTRACT

Disclosed herein is an animal nail filing apparatus. The apparatus includes a body having a first end, a second end, and at least one sidewall extending from the first end to the second end. A first parabolic-shaped recess is present in the first end of the body and has an abrasive surface for filing a nail of an animal. The first parabolic-shaped recess defines an axis of rotation extending between the first end and the second end of the body through its apex. The body is rotatable by hand about this axis of rotation. A second parabolic-shaped recess may also be present, preferably in the second end of the body. The second parabolic-shaped recess has an abrasive surface and may not be recessed as deeply into the body as the first parabolic-shaped recess.

20 Claims, 2 Drawing Sheets

NAIL FILING AND ROUNDING APPARATUS

FIELD

The present application relates generally to a nail filing apparatus and, more particularly, to apparatus for rounding clipped nails, such as the nails or claws of an animal.

BACKGROUND

People who groom dogs and other clawed animals generally use a pair of scissors or a guillotine style nail clipper to trim animal claws. Scissors and anvil style clippers pose a problem when clipping animal nails because the nail can often be crushed or splintered by an inaccurate angle of cut or dull clipper blades. The clipper also has a tendency to make the nail jagged and rough when cut. Rough or jagged edges may also result from a nail injury.

Some have tried using generic rotary sanding tools to file or smooth these jagged and rough edges of the nail, such as a Dremel-type tool. However, high-speed rotary tools have a number of disadvantages when compared to the present invention. By way of example, these tools make noise that can scare some animals and if the animal can see the high-speed rotating object, it may become fearful and anxious. Such tools also require a power source, such as a power cord, which can limit where the tool can be used and how it can be oriented in relation to the animal. If the tool uses batteries, the battery life can limit the tool's power, and replacing batteries can get expensive. These tools can also be dangerous to the animals because the free spinning, grinding wheel could slip and contact the animal's paw or if the animal has long hair, the hair could get wound around the shaft of the spinning grinding wheel. Problems such as these force many dog owners to have professional groomers perform this task at great expense.

The aforementioned mechanical rotary devices, while able to file an animal's nail, have numerous disadvantages and can pose a danger to the animal if not controlled properly. Accordingly, a new animal nail filing apparatus is desired that will not scare the animals with rotating parts or mechanical sounds and that is easy to use and control, yet is effective at filing or rounding rough edges from the animal's nails.

SUMMARY

One aspect of the animal nail filing apparatus disclosed herein includes a body having a first end, a second end, and at least one sidewall extending from the first end to the second end. A first parabolic-shaped recess is present in the first end of the body and has an abrasive surface for filing a nail of an animal. The first parabolic-shaped recess defines an axis of rotation extending between the first end and the second end of the body through its apex. The body is rotatable by hand about this axis of rotation to file the animal's nail. A second parabolic-shaped recess may also be present, preferably in the second end of the body. The second parabolic-shaped recess has an abrasive surface and may not be recessed as deeply into the body as the first parabolic-shaped recess.

In one aspect, the body may only have one side wall and be generally cylindrical or barrel-shaped. However, many other shapes for the body are possible.

In one aspect the body may include a continuous or discontinuous coating on the sidewall of the body. When the coating is discontinuous it may be discontinuous from the first end to the second end and comprise a first coating band proximal the first end and a second coating band proximal the second end. Between the first coating band and the second coating band the sidewall is exposed and may include an abrasive surface for further filing or polishing of the animal's nails.

In another aspect, the novel animal nail filing apparatus includes a body having a first end, a second end, and at least one sidewall extending from the first end to the second end. A first parabolic-shaped recess is present in the first end of the body and has an abrasive surface for filing a nail of an animal. The first parabolic-shaped recess defines an axis of rotation extending between the first end and the second end of the body through its apex. The body is rotatable by hand about this axis of rotation to file the animal's nail. The body also has a second parabolic-shaped recess present, but in the second end of the body, that has an abrasive surface. In this embodiment, the first parabolic-shaped recess is recessed deeper into the body than the second parabolic-shaped recess.

The body may again include a continuous or discontinuous coating on the sidewall of the body. When the coating is discontinuous it may be discontinuous from the first end to the second end and comprise a first coating band proximal the first end and a second coating band proximal the second end. Between the first coating band and the second coating band the sidewall is exposed and may include an abrasive surface for further filing or polishing of the animal's nails.

DETAILED DESCRIPTION

Figure 1:
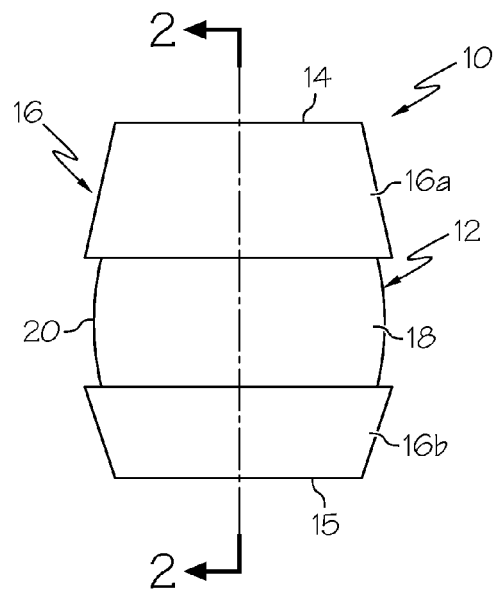
FIG. 1 is a side view of one embodiment of the disclosed nail rounding apparatus.

Referring to FIGS. 1-4, one aspect of the disclosed nail rounding apparatus, generally designated 10, may include a body 12 having a first end 14, a second end 15, and at least one sidewall 20 extending from the first end 14 to the second end 15. The first end 14 may include a first parabolic-shaped recess 22 that has an abrasive surface 26 for filing a nail or claw of an animal and may define an opening 23 into the first parabolic-shaped recess 22. The first parabolic-shaped recess 22 may define an axis of rotation 34 that extends from the first end 14 through the apex 32 of the first parabolic-shaped recess 22 to the second end 15.

Figure 4:
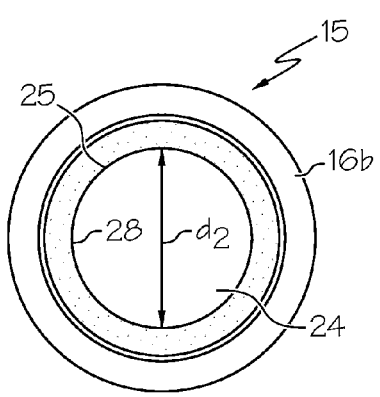
FIG. 4 is a bottom view of the nail rounding apparatus of FIG. 1.
Figure 5:
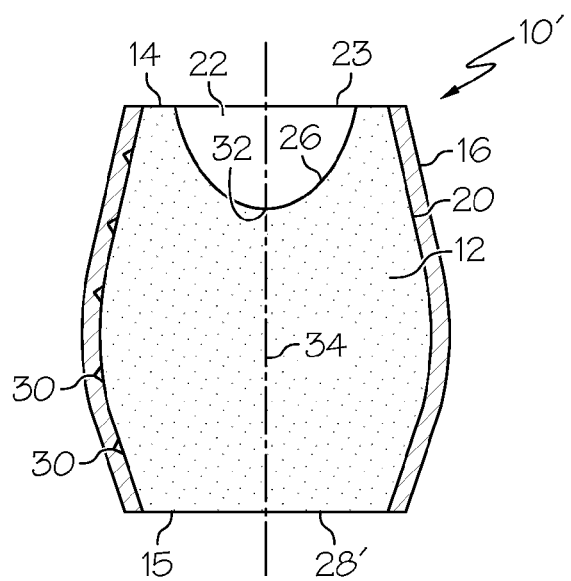
FIG. 5 is a cross-sectional view of another embodiment of the disclosed nail rounding apparatus.

The second end 15 may be a generally planar abrasive surface 28' devoid of a recess as shown in FIG. 5 and discussed in detail below. However, in FIGS. 1-4 the second end may include a second parabolic-shaped recess 24 that has an abrasive surface 28 for filing a nail or claw of an animal and may define an opening 25 into the second parabolic-shaped recess 24. The apex 36 of the second parabolic-shaped recess 24 may be aligned with the apex 32 of the first parabolic-shaped recess along the axis of rotation 34. Alternately, the apex 36 of the second parabolic-shaped recess 24 may be offset from the axis of rotation 34 defined by the first parabolic-shaped recess 22. In this embodiment, the second parabolic-shaped recess 24 would define a second axis of rotation (not shown) that extends between the first end 14 and the second end 15 through the apex of the second parabolic-shaped recess.

The body 12 may be a hand-graspable apparatus that may be rotated by a user as it is held against an animal's nail. When the nail is held in the first parabolic-shaped recess 22, the body 12 is rotatable by hand about the axis of rotation 34 defined by the first recess 22. The rotation of the body 12 against the animal's nail rounds or files any rough edges present. Rough edges may occur for any reason; however, rough edges are common after clipping an animal's nails. The user may rotate the body 12 clockwise about the axis of rotation 34, counter clockwise about the axis of rotation 34, or a combination thereof. The user may twist the body 12 back and forth between the clockwise and counterclockwise directions to round the animal's nail. Likewise, when the nail is held in the second parabolic-shaped recess 24, the body 12 is rotatable by hand about an axis of rotation defined by the second recess.

The body 12 may be any shape or size that allows for the user to rotate the body to file an animal's nail, including but not limited to a body that is cylindrical, barrel-shaped, cuboidal, conical, pyramidal, regular or irregular prisms, or is a frustum of a cone, a pyramid, or a prism. In one embodiment, body 12 may be generally cylindrical such that the sidewall 20 of the body 12 is generally straight. In another embodiment, body 12 may be barrel-shaped such that the sidewall 20 of the body 12 is generally curved, as shown in FIGS. 2 and 5.

Optionally, the sidewall 20 may include a non-uniform exterior surface to enhance the bonding of an optional coating 16 to the body 12. For example, the sidewall 20 may have ridges 30 on the exterior surface or any other feature as appreciated by one of skill in the art to enhance the bonding of the coating 16 to the sidewall 20 of the body 12.

Figure 2:
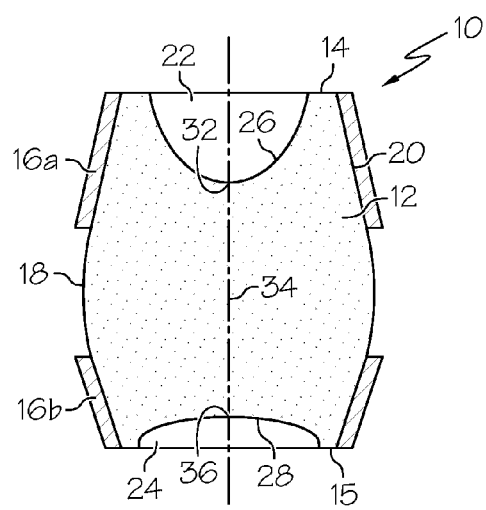
FIG. 2 is a cross-sectional view of the nail rounding apparatus of FIG. 1 taken along line 2-2.

As shown in FIG. 2, the first parabolic-shaped recess 22 may be recessed deeper into the body than the second parabolic-shaped recess 24. This is advantageous as the deeper recess may be preferable for larger breed animals, and the other recess may be preferable for smaller breed animals. In another embodiment, the first parabolic-shaped recess 22 may be curved such that it can file any size animal nail. The size of the animal nail will limit how far into the recess the nail can be received, with smaller nails being received further into the recess. In another embodiment, the first parabolic-shaped recess 22, the deeper recess, may be designed to file or round the nail or claw around its outer periphery whereas the second parabolic-shaped recess 24, the shallower recess, may be designed to file the end or tip of the nail or claw. In one embodiment, the first parabolic-shaped recess 22 is recessed about ¼ in into the first end 14 and the second parabolic-shaped recess 24 is recessed about ⅛ in into the second end 15.

Additionally, the first parabolic-shaped recess 22 and the second parabolic-shaped recess 24 may have the same or a different parabolic-shape, e.g., curvature. In one embodiment, like that shown in FIG. 2, the first parabolic-shaped recess 22 has a steeper curvature compared to the second parabolic-shaped recess 24.

Figure 3:
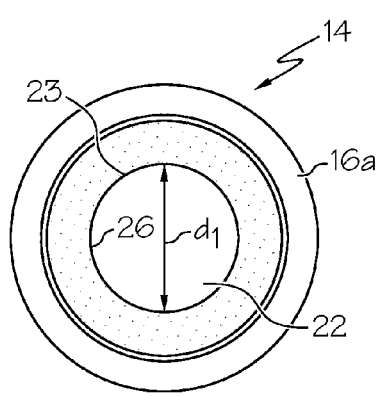
FIG. 3 is a top view of the nail rounding apparatus of FIG. 1.

The opening 23 into the first parabolic-shaped recess 22 has a diameter $d_1$ and the opening 25 into the second parabolic-shaped recess 24 has a diameter $d_2$ as illustrated in FIGS. 3 and 4. In one embodiment, $d_1$ and $d_2$ are the same. In another embodiment, $d_1$ and $d_2$ are different. While the exemplary embodiments shown in the figures only have one recess per end of the body 12, the apparatus is not limited thereto. One of skill in the art will appreciate that either or both ends of the body 12 may include one or more parabolic-shaped recesses of the same or different depth into the body and of the same or different diameter.

The body 12 may include a coating 16 on its exterior surface, such as on the sidewall 20. The coating 16 may be discontinuous, as shown in FIGS. 1-2, or continuous, as shown in FIG. 5. The coating 16 may generally cover all or a portion of the sidewall 20 of the body 12. Furthermore, the coating 16 may also cover all or a portion of the first and second ends 14, 15 of the body 12.

The discontinuous coating 16 may be discontinuous from the first end 14 to the second end 15 along the sidewall 20 and may comprise a first coating band 16a proximal to the first end 14 of the body 12 and a second coating band 16b proximal to the second end 15 of the body 12. Exposed sidewall 18 may interposes the first coating band 16a and the second coating band 16b and may include an abrasive or polishing surface.

For example, the coating 16 may be a natural or synthetic rubber or plastic material. As used herein, the word "coating" includes a casing that is shaped similar to the body that may slide over the body 12 and remain in place as well as a material or composition applied to the sidewall 20 by spray coating, powder coating, solution coating or melt coating, dipping, molding, and other well known techniques in the art. The coating 16 may be a non-slip coating that enhances a user's grip on the body 12. The non-slip coating can provide the user with better control of the apparatus as they file an animal's nails, thereby making the filing more efficient and effective. In one embodiment, the coating 16 may be a thermoplastic rubber. The coating 16 may have a textured exterior surface that enhances a user's grip on the body 12. As another example, the coating 16 may be sandpaper, for example 100 to 300 grit sandpaper. The coating 16 may also protect the surface of a countertop or furniture where the nail filing apparatus 10 is set when not in use from being scratched by the abrasive surfaces of the body 12, especially in the embodiment where the body 12 itself is formed of an abrasive material.

Figure 6:
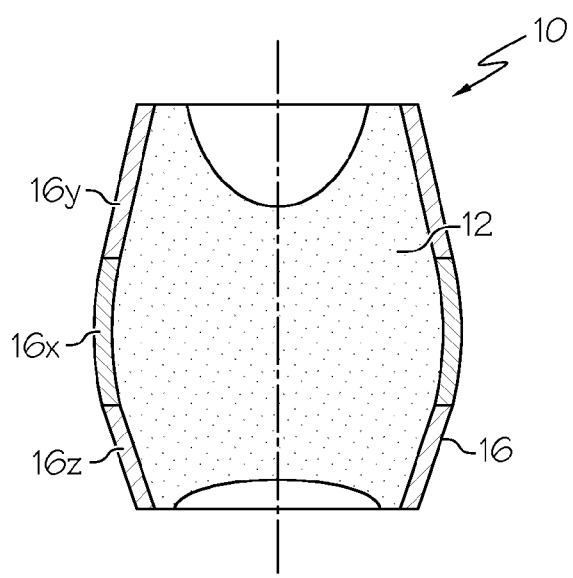
FIG. 6 is a cross-sectional view of yet another embodiment of the disclosed nail rounding apparatus.

At this point, those skilled in the art will appreciate that the coating 16 may be formed from a combination of different materials. For example, as shown in FIG. 6, the body 12 of the nail rounding apparatus 10 may include a multi-part coating 16 comprised of a circumferential band 16x of non-slip material (e.g., thermoplastic rubber) disposed between two circumferential bands 16y, 16z of hard plastic. The center circumferential band 16x may be textured, e.g., with ribs, grooves, ridges or the like, to further improve gripping.

The coating 16 may naturally adhere to the body 12, especially if the coating 16 has an elastomeric and/or an adhesive property. Other coatings 16 may be adhered to the body 12 with an adhesive. One of skill in the art will appreciate that numerous adhesives are commercially available and would be appropriate for such applications.

Now referring to FIG. 5, another aspect of the disclosed nail filing or rounding apparatus, generally designated 10', is shown that includes a body 12 having a first end 14, a second end 15, and at least one sidewall 20 extending from the first end 14 to the second end 15. The first end 14 includes a first parabolic-shaped recess 22 that has an abrasive surface 26 for filing a nail or claw of an animal and defines the opening 23 into the first parabolic-shaped recess 22. The first parabolic-shaped recess 22 defines an axis of rotation 34 that extends from the first end 14 through the apex 32 of the first parabolic-shaped recess 22 to the second end 15. In this embodiment, the second end 15 does not include a recess, but instead is a generally planar abrasive surface 28' for filing a nail or claw of an animal. The planar abrasive surface 28' may have the same abrasive characteristics and/or relationship to the abrasive surface 26 of the first parabolic-shaped recess 22 as the abrasive surface 28 of the second parabolic-shaped recess 24 described below.

The abrasive surfaces of the body 12 may be rendered abrasive by forming the body 12 from an abrasive material. Alternatively, the abrasive surfaces may be rendered abrasive by bonding an abrasive material ("grit") to a surface of the body 12, or by scoring, stamping, or grinding the surface of the body. Abrasive materials are generally characterized by high hardness and moderate to high fracture toughness. Examples of suitable abrasive materials include: silicon carbide (also known as carborundum), aluminium oxide or alumina, diamond, cubic boron nitride, garnet, zirconia/alumina alloys, glass, and colloidal silica.

In one embodiment, only the abrasive surface of the first parabolic-shaped recess, the second parabolic-shaped recess, and the exposed sidewall, if present, is abrasive. In another embodiment, the body is itself made of an abrasive material and, as such, the body forms the abrasive surfaces of the first parabolic-shaped recess, the second parabolic-shaped recess, and the exposed sidewall, when present.

In one embodiment, the abrasiveness of the abrasive surfaces of the first parabolic-shaped recess and the second parabolic shaped recess differ, e.g., one surface being a medium abrasiveness for the quick removal of material and the other surface being a fine abrasiveness for polishing the nail surface. In one embodiment, the abrasiveness of the abrasive surfaces of the first parabolic-shaped recess and the second parabolic shaped recess may be the same, yet differ from the abrasiveness of the exposed sidewall's abrasive surface. Preferably, the exposed sidewall has a finer abrasiveness than the first and the second parabolic-shaped recesses.

The abrasive material, if it is not the material that the body is formed of, may be adhered or bonded to the surface of the body using techniques known to one of skill in the art. When the abrasive material is abrasive particles or grit, the particles or grit may be mixed with a binder and formed into a desired shape, often by pressing, and then heated to a high temperature to induce bonding. Alternately, abrasive particles or grit may be mixed with a resin, glue or combination thereof and then coated on a surface to adhere or bond thereto.

The embodiments of this invention shown in the drawing and described above are exemplary of numerous embodiments that may be made within the scope of the appended claims. It is contemplated that numerous other configurations of the tensioner assemblies may be created taking advantage of the disclosed approach. In short, it is the applicant's intention that the scope of the patent issuing herefrom will be limited only by the scope of the appended claims.

What is claimed is:

1. A filing apparatus comprising:
   a body having a first end, a second end, and at least one wall extending from the first end to the second end;
   a first parabolic-shaped recess in the first end of the body, the first parabolic-shaped recess including an abrasive surface; and
   a discontinuous coating on the wall of the body that includes a first coating band proximal the first end and a second coating band proximal the second end.

2. The filing apparatus of claim 1 wherein the body is generally cylindrical.

3. The filing apparatus of claim 1 wherein the abrasive surface is sufficiently abrasive to file a nail of a dog.

4. The filing apparatus of claim 1 wherein a portion of the wall of the body is exposed between the first coating band and the second coating band and includes an abrasive surface.

5. The filing apparatus of claim 1 wherein the first parabolic-shaped recess defines an axis of rotation extending between the first end and the second end of the body through its apex, wherein the body is rotatable by hand about the axis of rotation.

6. A filing apparatus comprising:
   a body having a first end, a second end, and at least one wall extending from the first end to the second end;
   a first parabolic-shaped recess in the first end of the body, the first parabolic-shaped recess including an abrasive surface; and
   a second parabolic-shaped recess, the second parabolic-shaped recess being in the second end of the body and including an abrasive surface.

7. The filing apparatus of claim 6 wherein the first parabolic-shaped recess is recessed deeper into the body than the second parabolic-shaped recess.

8. The filing apparatus of claim 6 wherein the body is formed from an abrasive material.

9. The filing apparatus of claim 8 wherein the abrasive material includes silicon carbide.

10. The filing apparatus of claim 6 further comprising a continuous or discontinuous coating on the sidewall of the body.

11. The filing apparatus of claim 10 wherein the coating is or includes a thermoplastic rubber.

12. A Filing apparatus comprising:
    a body having a first end, a second end, and at least one sidewall extending from the first end to the second end;
    a first parabolic-shaped recess in the first end of the body, the first parabolic-shaped recess including an abrasive surface;
    a second parabolic-shaped recess in the second end of the body, the second parabolic-shaped recess including an abrasive surface;
    wherein the first parabolic-shaped recess is recessed deeper into the body than the second parabolic-shaped recess.

13. The filing apparatus of claim 12 wherein the body is generally cylindrical.

14. The filing apparatus of claim 12 further comprising a continuous or discontinuous coating on the sidewall of the body.

15. The filing apparatus of claim 14 wherein the coating is a thermoplastic rubber.

16. The filing apparatus of claim 14 wherein the coating is discontinuous from the first end to the second end and comprises a first coating band proximal the first end and a second coating band proximal the second end.

17. The filing apparatus of claim 16 wherein a portion of the sidewall of the body is exposed between the first coating band and the second coating band and includes an abrasive surface.

18. The filing apparatus of claim 12 wherein the abrasive surfaces of the first and the second parabolic-shaped recesses include silicon carbide.

19. The filing apparatus of claim 12 wherein the first parabolic-shaped recess defines an axis of rotation extending between the first end and the second end of the body through its apex, wherein the body is rotatable by hand about the axis of rotation.

20. The filing apparatus of claim 12 wherein the body is formed from silicon carbide.

* * * * *